United States Patent
Baney et al.

(10) Patent No.: US 7,466,929 B2
(45) Date of Patent: *Dec. 16, 2008

(54) METHOD AND SYSTEM FOR SUPERHETERODYNE DETECTION OF AN OPTICAL INPUT SIGNAL

(75) Inventors: Douglas M. Baney, Los Altos, CA (US); Tun S. Tan, Redwood City, CA (US); Bogdan Szafraniec, Sunnyvale, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 688 days.

This patent is subject to a terminal disclaimer.

(21) Appl. No.: 10/800,073

(22) Filed: Mar. 11, 2004

(65) Prior Publication Data

US 2005/0202793 A1    Sep. 15, 2005

(51) Int. Cl.
*H04B 10/06*    (2006.01)

(52) U.S. Cl. .................. 398/204; 398/202; 398/203; 398/205; 398/206; 398/207; 398/208; 398/209; 398/213; 398/214; 356/484; 356/451; 356/477; 356/73.1; 250/214 R; 250/227.27; 250/227.19; 250/227.17

(58) Field of Classification Search .......... 398/202, 398/204, 206, 207, 205, 208, 209, 213, 214, 398/203; 250/199, 214 R, 227.43, 227.19, 250/227.17; 455/189.1, 315, 619, 608, 609; 356/484, 451, 477, 73.1

See application file for complete search history.

(56) References Cited

U.S. PATENT DOCUMENTS

| | | | | |
|---|---|---|---|---|
| 3,975,628 A | * | 8/1976 | Graves et al. | ............... 398/204 |
| 4,553,264 A | | 11/1985 | Hasegawa et al. | |
| 4,723,317 A | * | 2/1988 | Glance | ....................... 398/204 |
| 5,134,509 A | * | 7/1992 | Olshansky et al. | ............ 398/76 |
| 5,305,134 A | * | 4/1994 | Tsushima et al. | ............. 398/91 |
| 5,631,760 A | * | 5/1997 | Heidemann | .................. 398/204 |
| 6,535,290 B1 | | 3/2003 | Spanner | |
| 6,850,710 B1 | * | 2/2005 | Mells | .......................... 398/163 |
| 7,265,849 B2 | * | 9/2007 | Gurunathan et al. | ......... 356/484 |
| 2004/0114939 A1 | * | 6/2004 | Taylor | ......................... 398/152 |

FOREIGN PATENT DOCUMENTS

| | | |
|---|---|---|
| CN | 1355969 A | 6/2002 |
| WO | 2000/077956 A1 | 12/2000 |

OTHER PUBLICATIONS

Szafraniec, et al.; "Polarization-Diverse Coherent Optical Spectrum Analyzer With Swept Local Oscillator"; ThGG5 5:30 pm; 2 sheets, 2002.
Baney, et al.; "Coherent Optical Spectrum Analyzer"; Ieee Photonics Technology Letters, vol. 14, No. 3.; Mar. 2002; pp. 355-357.
CN Application 200510053840.5, Office Action Dated Apr. 11, 2008, This office action is from the Chinese counterpart application, and recites the other documents in this Information Disclosure Statement.

* cited by examiner

*Primary Examiner*—Hanh Phan

(57) ABSTRACT

A system and method for superheterodyne detection in accordance with the invention. The system comprises a first conversion unit for performing a first heterodyne operation on an optical input signal to generate an electrical IF signal. A second conversion unit is electrically or optically coupled to the first conversion unit. The second conversion unit performs a second heterodyne operation to generate an electrical output signal suitable for signal processing.

20 Claims, 13 Drawing Sheets

METHOD AND SYSTEM FOR SUPERHETERODYNE DETECTION OF AN OPTICAL INPUT SIGNAL

TECHNICAL FIELD

The various embodiments in accordance with the invention relate generally to the field of optical measurements and measuring systems. Specifically, various embodiments in accordance with the invention relate to a system and method for superheterodyne detection of an optical input signal.

BACKGROUND ART

Increasing bandwidth demands on fiber-optic networks have driven network designs toward more closely spaced optical wavelength channels and also toward higher transmission bit rates. Spectral characteristics of these lightwave systems are indicators of transmission performance. For closely spaced dense wavelength-division-multiplexed (DWDM) systems, the limited resolution of conventional diffraction grating-based and autocorrelation-based optical spectrum analyzers (OSA) reduces the ability to measure spectral features between DWDM channels.

As an alternative to conventional OSAs, optical heterodyne detection systems can be utilized to monitor DWDM systems. In an optical heterodyne detection system two lasers operate at optical frequencies whose difference is within the frequency range of a microwave spectrum analyzer that is used to detect a generated heterodyne beat signal. One of the lasers is typically referred to as the local oscillator (LO).

FIG. 1 is a depiction of a prior art optical heterodyne detection system 100. The optical heterodyne detection system 100 includes an input signal 102, an input waveguide 104, a local oscillator signal 106, a local oscillator waveguide 108, an optical coupler 110, an output waveguide 118, a photodetector 112, and a signal processor 116. The principles of operation of optical heterodyne detection systems are well known in the field of optical heterodyne detection and involve monitoring the heterodyne term that is generated when an input signal is combined and mixed with a local oscillator signal.

However, in system 100, the resulting heterodyne beat signal from the photodetector 112 is normally bandwidth limited to provide high spectral resolution. As a result, due to the random difference in relative phasing of the optical input signal and the local oscillator signal, different responses are possible. In consequence, amplitude accuracy of the heterodyne optical spectrum analyzer is degraded by the phase noise. Moreover, intensity noise is a problem affecting prior art heterodyne optical spectrum analyzers. In some instances, the intensity noise renders measurement results inaccurate or unusable. As a consequence, amplitude accuracy of the heterodyne optical spectrum analyzer is degraded by the intensity noise.

BRIEF DESCRIPTION OF THE INVENTION

A system and method for superheterodyne detection of optical signals in accordance with the invention. The system includes an optical analyzer that performs two heterodyne conversions on an input signal to generate an output electrical signal that is less affected by intensity noise and suitable for processing.

In the first conversion, the optical input signal is converted to an intermediate frequency (IF) signal through a first heterodyne operation. Selection of a higher frequency of the IF signal results in a reduction of the effect of intensity noise. As a result, the use of the IF signal in the first heterodyne operation increases the separation in frequency of heterodyne image signals while lowering intensity noise. In this way, one of image signals is isolated for measurement without any interference from the other image signal, thereby resulting in increased resolution when measuring optical characteristics. Further, in a second conversion, further image reduction is performed through a band pass filter when the high frequency IF signal is downconverted to an electrical output signal through a second heterodyne operation. The resulting electrical output signal is suitable for processing.

Embodiments in accordance with the invention are capable of wider frequency separation between created image signals than in detection schemes of the prior art to allow for measurement of one image signal without interference from the other image signal, and without the use of complex balanced detection schemes. In addition, further optical band pass filtering of one of the image signals is possible due to the wider frequency separation. Embodiments in accordance with the invention achieve better resolution and increased amplitude accuracy when measuring optical characteristics of the optical input signal.

DETAILED DESCRIPTION OF THE INVENTION

Figure 1:
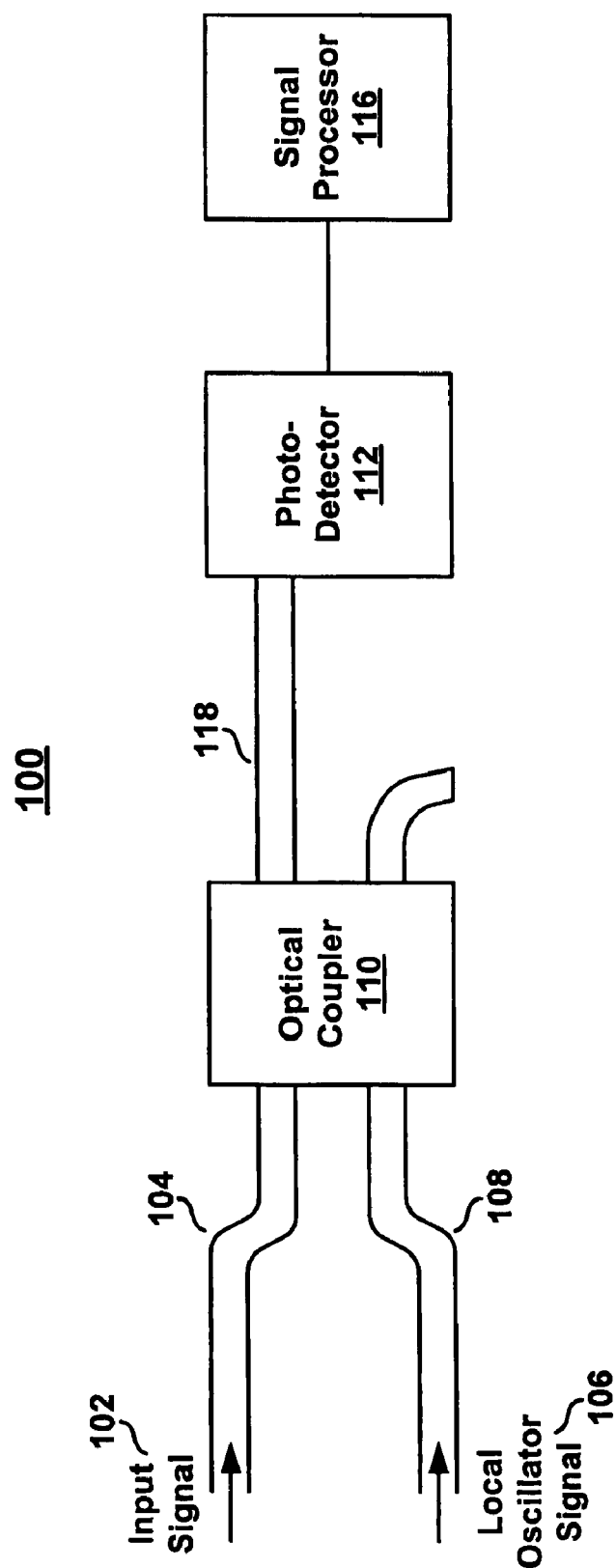
FIG. 1 is a depiction of a prior art optical heterodyne detection system that includes a single photodetector.

In the following detailed description of embodiments in accordance with the invention, numerous specific details are set forth in order to provide a thorough understanding of embodiments in accordance with the invention. However, it will be recognized that embodiments in accordance with the invention may be practiced without these specific details. In other instances, well known methods, procedures, components, and circuits have not been described in detail as not to unnecessarily obscure aspects of embodiments in accordance with the invention.

Accordingly, embodiments in accordance with the invention provide a superheterodyne optical analyzer performing double conversion. That is, embodiments in accordance with the invention provide superheterodyne optical analyzers that are capable of wider frequency or wavelength separation (e.g., several hundreds of picometers) between created image signals than in detection schemes of the prior art. This is achieved by operating at intermediate frequencies where the effect of intensity noise is reduced, such that the power spectrum of the intensity noise is low, and its effect on the heterodyne beat signal is minimal. This provides a higher signal-to-noise ratio while using only a single optical receiver, thus obviating in some situations the need to use complex balanced detection schemes to subtract the intensity noise. Also, in the case of an input signal from a single laser, the wider frequency separation between image signals allows for measurement of one image signal without interference from the other image signal. Hence, embodiments in accordance with the invention provide for superheterodyne optical analyzers that achieve better intensity noise reduction, better resolution, and increased amplitude accuracy, as will be explained below, as compared to conventional detection systems, when measuring optical characteristics of the optical input signal.

The following discussion begins with a description of the structure of components of superheterodyne optical analyzers, for embodiments in accordance with the invention. Each description of the structure will be followed with a description of their specific operation. With respect to the superheterodyne optical analyzers, the structure includes prefilters, filters, heterodyne mixers, detectors, receivers, and signal processors, in embodiments in accordance with the invention. In addition, components of the superheterodyne optical analyzers perform operations that include prefiltering, filtering, heterodyne mixing, detection, receiving, and signal processing, in embodiments in accordance with the invention. In some embodiments in accordance with the invention, the superheterodyne optical analyzer performs functions of a spectrum analyzer.

In some embodiments in accordance with the invention, a superheterodyne optical analyzer performs double conversion when measuring optical characteristics of an input signal. Fundamental components of the superheterodyne optical analyzer include a first conversion unit performing a first heterodyne operation, and a second conversion unit performing a second heterodyne operation. The resulting electrical output signal is suitable for signal processing. Such embodiments are described further in conjunction with FIG. 2 and FIG. 3.

In other embodiments in accordance with the invention, a superheterodyne optical analyzer performs double conversion in both the optical and electrical domains. Specifically, two images are formed from the heterodyne beat signal through the first heterodyne operation by mixing of the LO with spectral components of the input signal that are below and above the LO frequency and separated from it by the IF. For an input optical signal that contains a single optical frequency and a swept LO this corresponds to creating two separate images of the single input frequency. The frequency of the IF signal is selected to reduce the effect of intensity noise. At higher frequencies of the IF signal, the images exhibit a wider frequency separation, and provide for measurement without interference between the images. As a result, an increase in resolution is achieved when measuring optical characteristics of the input signal. Such embodiments in accordance with the invention are described further in conjunction with FIG. 4, FIG. 5, FIG. 6, and FIG. 7.

In yet another embodiment, a superheterodyne optical analyzer performs double conversion primarily in the optical domain. The superheterodyne optical analyzer is capable of rejecting one image of two possible images formed from the heterodyne beat signal through the first heterodyne operation at an optical intermediate frequency (IF) by optical filtering. Such embodiment in accordance with the invention is described further in conjunction with FIG. 8A, and FIG. 8B.

In yet other embodiments, a superheterodyne optical analyzer performs first conversion in the optical domain and second conversion in the electrical domain. The superheterodyne optical analyzer is capable of rejecting one image of two possible images formed from the heterodyne beat signal through the first heterodyne operation by optical filtering. In the second conversion in the electrical domain, the rejection of one of the images is accomplished through the combined efforts of a band pass filter and an image reducing (IR) mixer. Specifically, when combining the image reduction effects of the band pass filter and a microwave image reject (IR) mixer that performs the second conversion, a further reduction of one of the pair of heterodyne images is possible. As a result, an increase in amplitude accuracy is achieved when measuring optical characteristics of the input signal, as will be explained below. Such embodiments in accordance with the invention are described further in conjunction with FIG. 10A and FIG. 10B.

A Superheterodyne Optical Analyzer Performing Double Conversion

Figure 2:
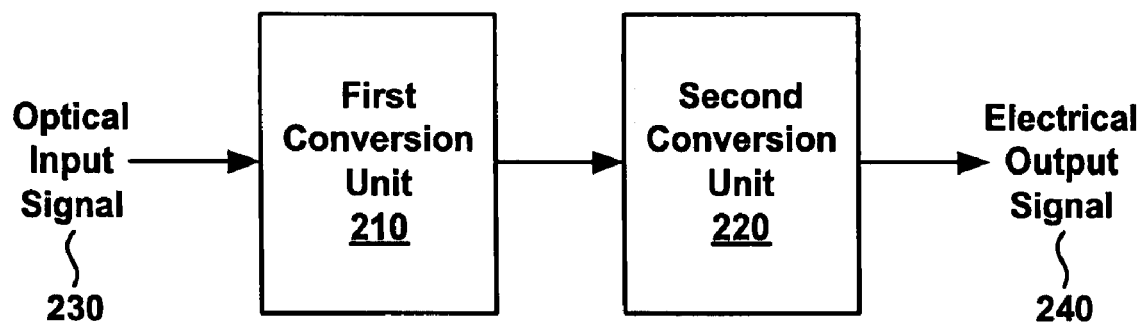
FIG. 2 is a block diagram of a superheterodyne optical analyzer performing double conversion for measuring an optical input signal, in accordance with the invention.
Figure 3:
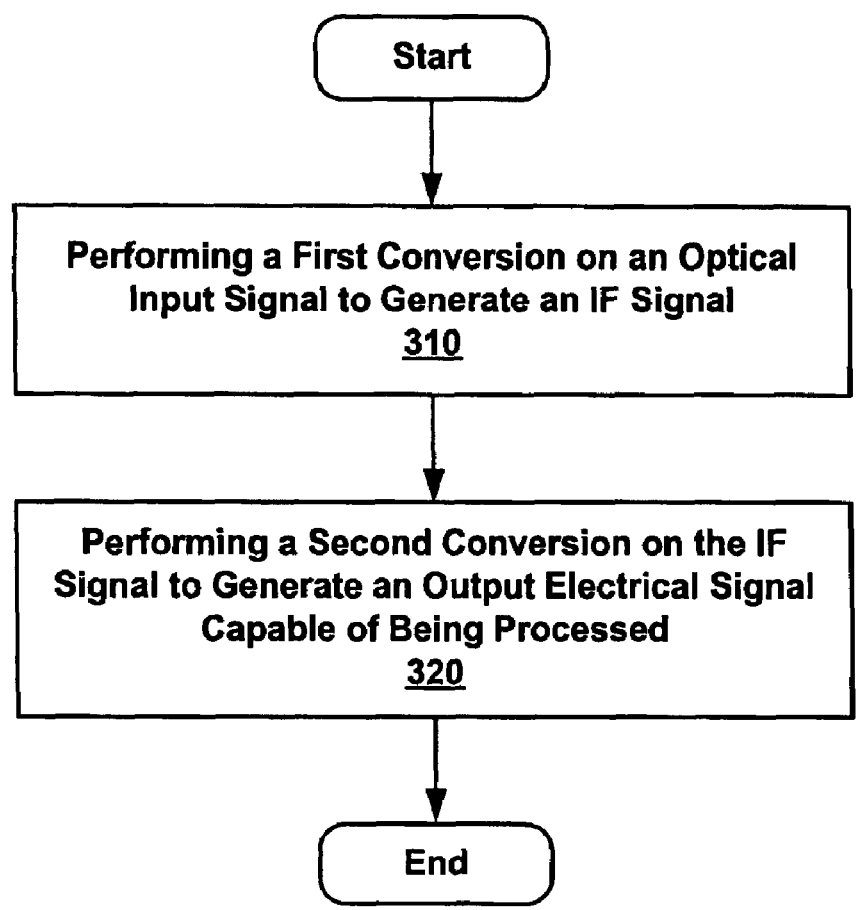
FIG. 3 is a flow chart illustrating a method for superheterodyne detection of optical input signals, in accordance with the invention.

Referring now to FIG. 2 and FIG. 3, the following discussion begins with a description of the structure of components of a superheterodyne optical analyzer performing double conversion, for embodiments in accordance with the invention. Thereafter, a description of the specific operation of the superheterodyne optical analyzer is disclosed.

Structure of the Superheterodyne Optical Analyzer Performing Double Conversion In FIG. 2, a block diagram is shown illustrating a superheterodyne optical analyzer 200 that performs double conversion, for an embodiment in accordance with the invention. FIG. 2 provides fundamental components of the superheterodyne optical analyzer 200. The superheterodyne optical analyzer 200 comprises a first conversion unit 210 and a second conversion unit 220. The first conversion unit performs a first heterodyne operation to convert an optical input signal 230 into an intermediate frequency (IF) signal in either the optical or the electrical domain.

Further, the first conversion unit 210 is optically or electrically coupled to the second conversion unit 220. The second conversion unit 220 performs a second heterodyne operation to convert the electrical IF signal to an electrical output signal 240. The second conversion unit 220 is capable of downconverting the electrical output signal 240 to a low enough frequency that is suitable for signal processing. That is, the frequency of the electrical output signal is of a frequency that can be analyzed without further conversions.

Hence, the fundamental components of the superheterodyne optical analyzer 200 is capable of improved resolution and amplitude accuracy without implementing the complex balanced detection schemes that cancel intensity noise present in conventional detection systems.

Operational Characteristics of the Superheterodyne Optical Analyzer Performing Double Conversion Referring to FIG. 3, a flow chart 300 is described illustrating a method for superheterodyne detection of optical signals, in accordance with the embodiment of the invention of FIG. 2. Namely, the method described in flow chart 300 describes the operational characteristics of the superheterodyne optical analyzer 200 of FIG. 2.

The method in flow chart 300 begins by performing a first conversion on an optical input signal in order to generate an IF signal, at 310. The generated IF signal from a heterodyne beat signal includes two images formed when the frequency of the local oscillator signal is above or below the frequency of the optical input signal by the selected IF. Operation at the selected IF provides for better improved amplitude accuracy by removing the earlier mentioned dependency on the random phase between the optical input signal and the local oscillator signal. Suppression of this phase related sensitivity is referred to as phase diversity. Phase diversity issues can be resolved using a low frequency IF or high frequency IF. While the low frequency IF does not necessarily provide for intensity noise reduction, either the low frequency IF or high frequency IF improves amplitude accuracy. However, intensity noise still has an adverse effect for the low frequency IF.

To resolve the adverse effect of intensity noise, the IF frequency is selected to move the generated IF signal to lesser intensity components of the intensity noise for intensity noise immunity. By operating at the selected IF frequency, the negative effect of intensity noise is reduced, and as a result, a higher signal-to-noise ratio is achieved. As such, at the selected frequency in the IF signal used in some embodiments in accordance with the invention, balanced detection schemes are unnecessary for canceling intensity noise.

As a further benefit, by operating at the selected IF frequency, images that are generated from a heterodyne beat signal in the IF signal are separated in optical frequency by a difference substantial enough for improved measurement of the input signal, in the case of a single optical input signal. Specifically, the separation between the image signals allows for measurement of one of the image signals without any interference from the other image signal, in one embodiment in accordance with the invention. In addition, filtering techniques, such as a preselector, can be implemented to filter out an unwanted image.

At 320 of flow chart 300, the method continues by performing a second conversion on the IF signal, that is generated by the first conversion, to generate an electrical output signal at yet lower electrical frequency. In one instance, the electrical output signal is downconverted to an appropriate frequency suitable for signal processing.

The method disclosed in flow chart 300 in FIG. 3 performs a double conversion on the optical input signal, and, as such, is implemented in superheterodyne optical analyzers for measuring optical characteristics of the input signal. As a result, the method provides for implementing superheterodyne optical detection that achieves improved resolution and reduces the effect of intensity noise without implementing complex detection schemes, such as using balanced detection to cancel intensity noise. Specifically, the use of balanced detection schemes is unnecessary in some embodiments in accordance with the invention since a higher signal-to-noise ratio is achieved by generating the IF signal at appropriate IF frequencies. In addition, the method in flow chart 300 is capable of generating an electrical output signal that is capable of being processed without further conversion.

A Superheterodyne Optical Analyzer Performing Double Conversion in Both the Optical and Electrical Domains Referring now to FIG. 4, FIG. 5, FIG. 6, and FIG. 7, the following discussion begins with a description of the structure of components of superheterodyne optical analyzers performing double conversion in both the optical and electrical domains, for embodiments in accordance with the invention. Thereafter, a description of the specific operation of the superheterodyne optical analyzer is disclosed.

Figure 4:
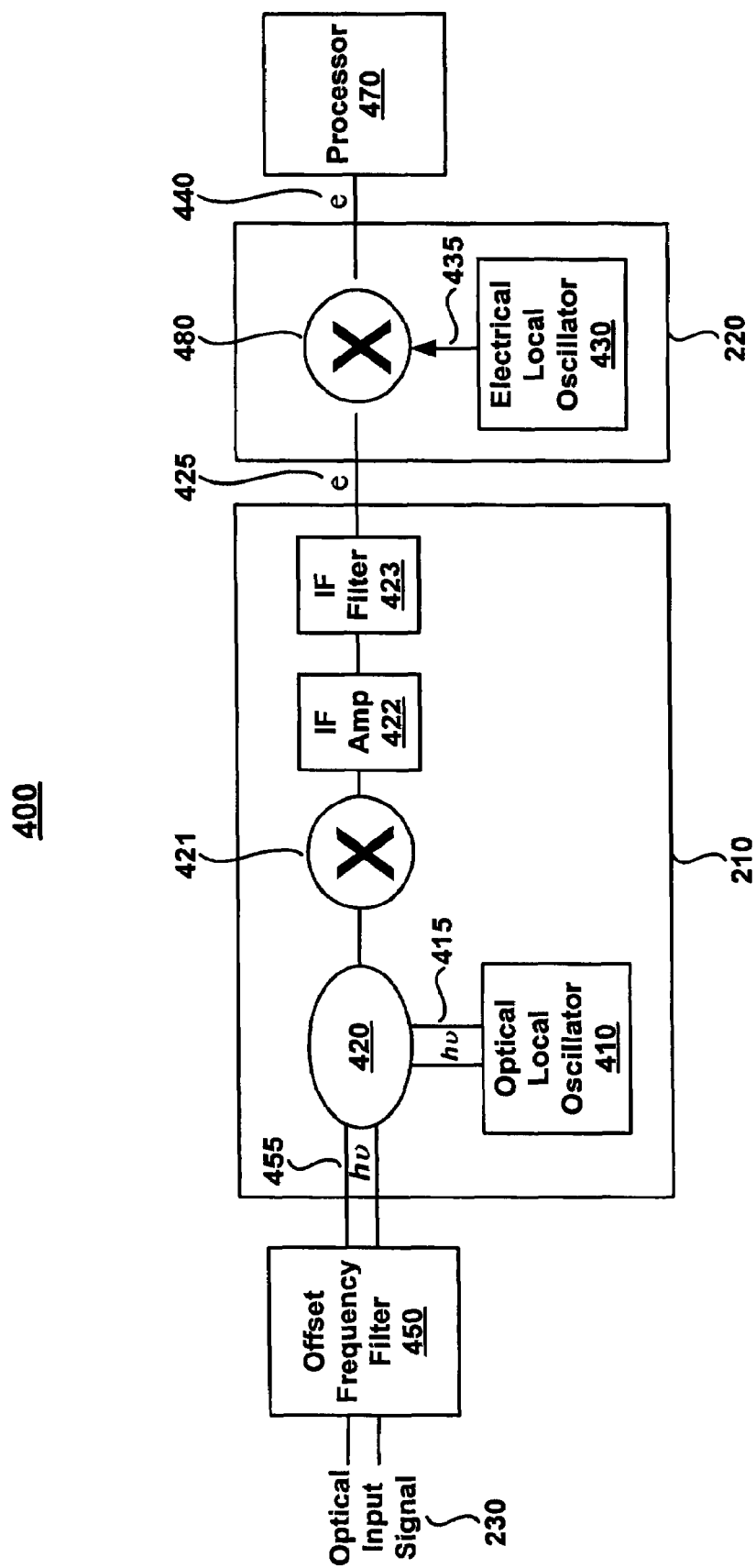
FIG. 4 is a block diagram of a superheterodyne optical analyzer performing double conversion in both the optical and electrical domains, in accordance with the invention.

Structure of the Superheterodyne Optical Analyzer Performing Double Conversion in Both the Optical and Electrical Domains In FIG. 4, a block diagram is shown illustrating a superheterodyne optical analyzer 400 performing double conversion both in the optical and electrical domains, in accordance with one embodiment in accordance with the invention. The superheterodyne optical analyzer 400 comprises the first conversion unit 210 and second conversion unit 220 of FIG. 2, and further includes additional features, such as, the offset frequency filter 450, and signal processor 470.

Specifically, the superheterodyne optical analyzer 400 comprises the first conversion unit 210 and the second conversion unit 220 of FIG. 2. The first conversion unit performs a first heterodyne operation to convert an input signal 230 into an electrical intermediate frequency (IF) signal. The superheterodyne optical analyzer 400 generates the IF signal in the electrical domain.

Further, the superheterodyne optical analyzer 400 comprises an optical offset frequency filter 450 that takes as an input the optical input signal 230. The offset frequency filter 450 is optional, and is implemented depending on the measuring requirements. The offset frequency filter 450 reduces intensity noise from the optical input signal 230, and partially rejects one of the image responses. This is accomplished by the offset of the center frequency of the optical band-pass filter with respect to the LO frequency. The offset frequency filter 450 generates a filtered optical input signal 455. The functional characteristics of the offset frequency filter 450 are discussed more fully below.

Continuing with FIG. 4, the superheterodyne optical analyzer 400 comprises the first conversion unit 210 of FIG. 2 optically coupled to the offset frequency filter 450. More particularly, the first conversion unit 210 as shown in FIG. 4 comprises a coupler 420 that combines the filtered optical input signal 455 with an optical local oscillator signal 415 from the optical local oscillator 410.

The first conversion unit 210 also comprises an optical detector 421 to perform a first heterodyne operation that generates a heterodyne beat signal. The detector is a square-law detector and acts as a mixer, therefore, it is marked by "X" in the figure. As such, the optical detector 421 converts the filtered optical input signal 455 to an electrical signal through a non-linear function. The square-law detection converts light intensity into an electrical current. That is, electrical current is proportional to a square of the electrical field of the input optical wave.

An IF amplifier 422 and the IF filter 423 receive the electrical heterodyne beat signal to generate the electrical IF signal 425. That is, any signal that falls within the passband of the IF amplifier 422 and the IF filter 423 will be amplified and passed on. As such, the optical detector 421 converts the combined optical input signal and the optical LO signal into the electrical heterodyne beat signal that is amplified and filtered to provide the electrical IF signal 425. For an optical input signal 230 at a single frequency (e.g., single laser source), the electrical heterodyne beat signal changes frequency as the optical LO signal 415 is swept. Consequently, the electrical heterodyne beat signal sweeps through the frequency range of the IF filter 423 and gives rise to two images that correspond to the LO frequency being located above and below the frequency of the optical input signal 230 by an IF frequency.

The IF frequency is selected in order to pass the electrical IF signal 425 at a frequency that is minimally affected by intensity noise. That is, weaker components of the intensity noise occur at the frequency of the electrical IF signal 425, and minimize the effect of the intensity noise. As a result, the requirement for balanced detection to cancel intensity noise is reduced or eliminated since intensity noise has minimal effect on the electrical IF signal 425 in the superheterodyne optical analyzer 400 operating at the suitable IF frequency.

In FIG. 4, the second conversion unit 220 performs a second heterodyne operation to convert the electrical IF frequency signal 425 to an electrical output signal 440 that is capable of being processed. More specifically, the superheterodyne optical analyzer 400 of FIG. 4 downconverts the electrical IF frequency signal 425 to a frequency (at the electrical output signal 440) that is suitable for processing. The second conversion unit 220, as shown in FIG. 4, comprises a mixer 480 that mixes the electrical IF frequency signal 425 and an electrical local oscillator signal 435 that is provided from the electrical local oscillator 430. The mixer 480 generates the electrical output signal 440.

Continuing with FIG. 4, a signal processor 470 is electrically coupled to the second conversion unit 220 for processing the electrical output signal 440. The superheterodyne optical analyzer 400 is capable of measuring field spectrum characteristics of the optical input signal 230, for embodiments in accordance with the invention. This is possible in the electrical domain, since the electrical current is proportional to the intensity of the combined input optical signal and the optical LO signal. Since the intensity of the combined signals contains product of the electrical fields and the electrical field of the LO is constant the electrical current is actually proportional to the electrical field of the optical input signal. For other embodiments in accordance with the invention, the superheterodyne optical analyzer 400 is capable of measuring parameters associated with the input signal. These parameters include, but are not limited to the following: polarization dependent gain (PDG), polarization dependent loss (PDL), polarization mode dispersion (PMD), etc.

The signal processor 470 is capable of processing the electrical output signal 440 in its analog form as generated by the mixer 480, for embodiments in accordance with the invention. In still other embodiments in accordance with the invention, the signal processor 470 comprises a digital signal processor and provides analog to digital conversion of the electrical output signal 440 in its analog form as generated by the mixer 480.

Hence, the superheterodyne optical analyzer 400 is capable of better amplitude accuracy, better noise reduction through the application of the optical offset frequency filter without implementing balanced detection schemes used in conventional systems, and provides for improved resolution than that in conventional systems.

Figure 5:
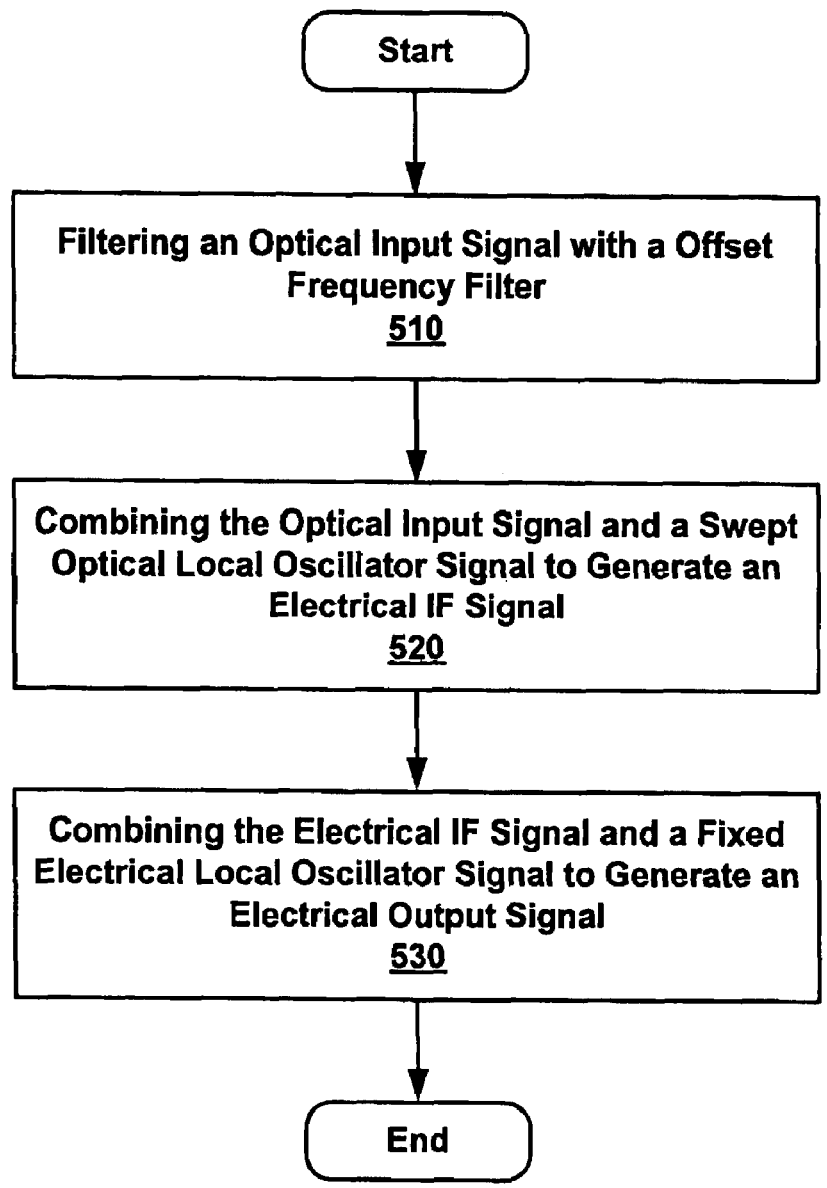
FIG. 5 is a flow chart illustrating a method for superheterodyne detection of optical input signals by performing double conversion both in the optical and electrical domains, in accordance with the invention.

Operational Characteristics of the Superheterodyne Optical Analyzer Performing Double Conversion in Both the Optical and Electrical Domains Referring now to FIG. 5, a flow chart 500 is described illustrating a method for superheterodyne detection of optical signals by performing double conversion both in the optical and electrical domains, in another embodiment in accordance with the invention. The method described in flow chart 500 describes the operational characteristics of the superheterodyne optical analyzer 400 of FIG. 4.

The method begins by filtering an optical input signal with a frequency offset filter, in 510. The frequency offset filter is capable of reducing intensity noise and an image that is formed from the heterodyne beat signal. The optical filter that tracks the local oscillator signal and remains at an approximately constant positive or negative offset from the local oscillator frequency equal to the IF allows only for the interaction of the local oscillator with the positive (or negative) frequencies of the measured signal. The positive frequencies are defined as those larger than the frequency of the local oscillator signal. Consequently, the negative image associated with the negative frequencies of the measured optical signal (frequencies smaller than the local oscillator) is suppressed, or reduced.

At 520, the method combines the optical input signal and an optical swept local oscillator signal to generate an IF signal in the electrical domain. The resulting electrical IF signal comprises heterodyne images, each of which contains complete information pertaining to the optical characteristics of the optical input signal. In another embodiment in accordance with the invention, the images in the electrical IF signal are sufficiently spaced apart in optical frequency because of the IF frequency selected, e.g., higher IF frequencies. As a result, an optical offset filter is capable of eliminating one of the images.

Figure 11:
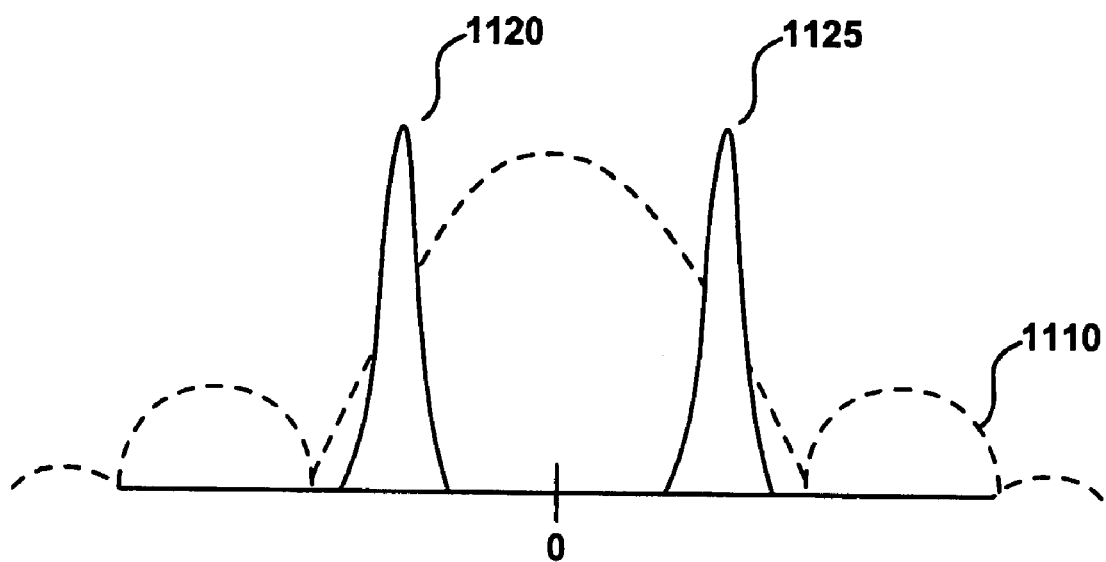
FIG. 11 is a spectral diagram of intensity noise, and images of a heterodyne beat signal, in accordance with one embodiment of the present invention.

As a further benefit, by operating at the selected IF frequency, the negative effect of intensity noise is reduced, and as a result, a higher signal-to-noise ratio is achieved. FIG. 11 is a diagram 1100 illustrating the spectrum of the intensity noise signal 1110 having a characteristic $\sin(f)/f$ power spectrum density function. Images 1120 and 1125 of the heterodyne beat signal occur at above and below the local oscillator signal by the IF frequency. As illustrated in the figure, the properly selected IF frequency reduces the spectral component of the intensity noise signal 1110. Additionally, including a preselector will further suppress the intensity noise signal 1110, as a smaller width of the potentially multi-channel spectrum is observed through the preselector. Namely, the intensity noise of the lasers sources that are outside of the preselector pass-band is not visible. As such, at the IF frequency in the IF signals used in embodiments in accordance with the invention, balanced detection schemes are unnecessary for reducing intensity noise.

At 530 in FIG. 5, the method combines the filtered electrical IF signal and a fixed electrical local oscillator signal to generate an electrical output signal that is suitable for being processed. Specifically, the method at 530 downconverts the electrical IF signal to a frequency that is suitable for being processed. For example, the resulting frequency is lower than the Nyquist frequency of the digital sampling system. The output electrical signal is processed to measure a field spectrum of the optical input signal. This is possible in the electrical domain, since current is proportional to the electrical field of the optical input signal. Also, the output electrical signal is processed to measure optical characteristics of the optical input signal, such as, parameters of the optical input signal, as described previously.

Reduction of Intensity Noise in the Superheterodyne Optical Analyzer

Referring back to FIG. 4, the offset frequency filter 450 is capable of reducing intensity noise in the optical input signal 230. Also, the offset frequency filter 450 partially attenuates signal intensity of an image present in the heterodyne beat signal generated from the receiver 421. A positive offset of the offset frequency filter (or preselector) maximizes the interaction of the local oscillator with the optical signal frequencies that are higher than the local oscillator frequency by the frequency equal to the IF frequency. At the same time, optical frequencies that are lower than the local oscillator frequency are attenuated. Thus, the negative image is reduced or suppressed.

With regard to intensity noise, some input signals have intensity noise which can extend out to high frequencies. For example, the intensity noise bandwidth can extend out to 40 GHz and beyond which overlaps the practical electronic detection bandwidth of most receivers. Traditional balanced receivers and optical preselector filters can be used to reduce intensity noise. Typically, the noise reduction afforded by balanced receivers only does not provide for total suppression of intensity noise.

On the other hand, the offset frequency filter 450 is able to suppress more fully the intensity noise. As shown in FIG. 4, the offset frequency filter 450 is placed in the path of the input signal. As such, the optical input signal 230 is filtered by the offset frequency filter 450 to generate a filtered optical input signal 455. The filtered optical input signal 455 is input into the first conversion unit 210.

In another embodiment in accordance with the invention, the optical coupler unit 420 may contain a polarization independent beam splitter or a polarizing beam splitter that is placed in front of the photodetector 421 that acts as a mixer of the filtered optical input signal 455 and an optical local oscillator signal 415. For example, some spectrum analyzer architectures that are independent of the polarization state of the measured input signal may contain a polarizing beam splitter within the optical receiver (e.g., a polarization diversity receiver).

The offset frequency filter 450 reduces all noise in the detection band of the multi-channel system, and reduces or suppresses the intensity of an unwanted image in the heterodyne beat signal. As such, the offset frequency filter 450 is capable of reducing both intensity noise and images created by the spectral components of the input optical signal that are above or below the frequency of the local oscillator signal by the IF.

More particularly, the offset frequency of the offset frequency filter 450 is set to the IF frequency of the optical detection receiver found within the first conversion unit 210. For example, when the IF frequency is 30 GHz, the offset frequency is set at 30 GHz to reduce one of the heterodyne image signals. This is because two heterodyne image signals are formed at the IF frequency when the following condition is met: $v_{LO}=v_S+/-f_{IF}$. In this case, $v_{LO}$ is the frequency of the local oscillator signal 410, $v_S$ is the frequency of the measured optical input signal 230, and $f_{IF}$ is the frequency of the IF signal.

The offset frequency filter 450 is capable of reducing detected intensity noise. For example, the optical field spectrum can be represented by a rectangularly shaped optical field spectrum of width $\Delta v_u$. This spectrum is an approximate model of the amplified spontaneous emission (ASE) noise from an optical amplifier and is an approximation to the spectrum of a modulated laser. The relative intensity noise (RIN) that is generated by this spectrum is given by Equation 1, as follows:

$$RIN(f) \cong \frac{1}{\Delta v_u} \Lambda\left(\frac{f}{\Delta v_u}\right) \tag{1}$$

where $\Lambda$ is a triangular function equal to 1 at zero and linearly approaching zero at $+/-\Delta v_u$.

In addition, the intensity noise spectrum is proportional to RIN as defined in Equation 1 by way of average optical power-squared. As such, the intensity noise spectrum is described by Equation 2, as follows:

$$S_i(f) = \frac{\langle P \rangle^2}{\Delta v_u} \Lambda\left(\frac{f}{\Delta v_u}\right) \tag{2}$$

Typically, the strength of the intensity noise spectrum ($S_i(f)$) before filtering determines the effect of the intensity noise on the detection of the electrical heterodyne beat signal. Specifically, in some cases, the intensity noise spectrum actually overlaps the IF filter. As such, this results in detection of the intensity noise, which produces a degradation in dynamic range of instrument.

On the other hand, the application of the offset frequency filter in embodiments in accordance with the invention is able to reduce the strength of intensity noise. As shown in equation (1), the spectrum of intensity noise is described by a triangular function that approaches zero at $f=\Delta v_u$. The heterodyne beat tone is measured at the frequency of the IF filter, $f_{IF}$. Therefore, the higher the IF frequency, the smaller is the observed intensity noise. When $f_{IF} > \Delta v_u$ and the bandwidth of the IF filter is narrow, the intensity noise is completely suppressed. Of course, that requires that the offset frequency filter is leading or lagging the local oscillator by the frequency equal to the IF frequency. Then, relative intensity noise does not overlap the IF filter when measuring the optical spectrum of the input optical signal. After application of the preselector function of the offset frequency filter 450 having an optical bandwidth $\Delta v_f$, where $\Delta v_f < \Delta v_u$, the new RIN is described in Equation 3 below. The equation (3) assumes that the shape of the preselector filter is rectangular, thus, the filtered spectrum is also rectangular. As such, in embodiments in accordance with the invention, the offset frequency filter is able to suppress more fully the strength of relative intensity noise for the same IF, which beneficially increases the dynamic range of instrument measurements.

$$RIN(f) = \frac{1}{\Delta v_f} \Lambda\left(\frac{f}{\Delta v_f}\right) \tag{3}$$

To further understand the mechanics of intensity noise reduction, consider the spectrum of a modulated signal. Supposing that the preselector in the offset frequency filter is able to pass a portion of the optical field spectrum that is responsible for the intensity noise. Then, the spectral extent of the intensity noise is equal to the maximum extent of the possible beating pairs comprising the optical spectrum that lie within the passband of the optical preselector.

For example, supposing that the IF frequency is equal to zero and the preselector has a square passband shape of 20 GHz. The peak of the intensity noise spectrum described by equation (3) is located at zero and decreases linearly for higher frequencies. Since the IF was set to zero, the intensity noise spectrum and the heterodyne beat spectrum overlap. However, all intensity noise above 20 GHz would be reduced by the rejection capability of the preselector. If the IF frequency is higher than the preselector passband width, $\Delta v_f$, then the intensity noise would be substantially reduced as its triangular spectrum approaches zero at $f = \Delta v_f$. As such, in general, for a fixed offset filter width, the higher the IF frequency, the better the rejection of the intensity noise signal.

The limitation in dynamic range can be estimated by ratioing the maximum heterodyne beat signal to the detected noise. The ratio is expressed in Equation 4, as follows:

$$DR(f) \approx \frac{\Re^2 P_{LO} P_{sig}}{B_e(\Re^2 \langle S_I(f) \rangle_{B_e} + S_{shot} + S_{th} + \Re^2 S_{LO})} \quad (4)$$

In Equation 4, the spectral width of the LO and signal are assumed to fall within the detection bandwidth $B_E$. Also, $S_I(f)$ is the detected optical input signal intensity noise density integrated over the electrical bandwidth $B_e$ about baseband frequency $f$, $S_{shot}$ is the electrical shot noise current density, $S_{th}$ is the receiver electrical thermal noise current density, $S_{LO}$ is the optical LO excess intensity noise, and $\Re$ is the responsivity of the simple photodetection.

As such, the dynamic range improvement, caused by the optical preselector filter, ignoring optical filter loss and other sources of noise such as shot noise, thermal noise and the local oscillator intensity noise is described in Equation 5, as follows:

$$\Delta DR(f) \approx \frac{\Re^2 P_{LO} P_{sig}}{\Re^2 \langle S_I(f)_f \rangle_{B_e}} + \frac{\Re^2 P_{LO} P_{sig}}{\Re^2 \langle S_I(f)_u \rangle_{B_e}} = \frac{\langle S_I(f)_u \rangle_{B_e}}{\langle S_I(f)_f \rangle_{B_e}} \quad (5)$$

In Equation 5, subscript "$f$" indicates filtering by an optical preselector filter, while subscript "$u$" refers to the case of no optical filtering.

As such, the dynamic range improvement at the IF frequency $f = f_{IF}$, ignoring other sources of noise, such as shot noise, is described in Equation 6, as follows:

$$\Delta DR(f_{IF}) \approx \frac{\frac{\langle P_u \rangle^2}{\Delta v_u} \Lambda\left(\frac{f_{IF}}{\Delta v_u}\right)}{\frac{\langle P_f \rangle^2}{\Delta v_f} \Lambda\left(\frac{f_{IF}}{\Delta v_f}\right)} \quad (6)$$

-continued $$\approx \frac{\frac{\langle S_E \Delta v_u \rangle^2}{\Delta v_u} \Lambda\left(\frac{f_{IF}}{\Delta v_u}\right)}{\frac{\langle S_E \Delta V_f \rangle^2}{\Delta v_f} \Lambda\left(\frac{f_{IF}}{\Delta v_f}\right)}$$

$$\approx \frac{\Delta v_u}{\Delta v_f} \times \frac{\Lambda\left(\frac{f_{IF}}{\Delta v_u}\right)}{\Lambda\left(\frac{f_{IF}}{\Delta v_f}\right)}$$

In Equation 6, $S_E$ is the optical spectrum density of an assumed uniform noise field with a rectangularly shaped spectrum that is broader than the preselector optical filter.

As can be seen in Equation 6, the dynamic range improvement has two factors. The first factor is the ratio of the unfiltered spectral width to the preselector width with an assumed rectangular shape of the optical spectrum and the preselector for the purpose of this simplified explanation. The second factor is due to the attenuation of the spectral extent of the noise at the IF. The second improvement factor is a benefit of the offset frequency filter (e.g., offset frequency filter 450).

Ideally, a narrow preselector function $\Delta v_f$ shows a significant improvement in dynamic range, since the function $\Lambda(f_{IF}/\Delta v_f)$ approaches zero for $f_{IF}/\Delta v_f \geq 1$. Then, theoretically, the dynamic range described by equation (6) approaches infinity. In reality, the local oscillator also generates an associated intensity noise. This local oscillator intensity noise is reduced through balanced detection, however, the balancing process is never perfect. Also, the fundamental limit is determined by the shot noise that was excluded from this analysis.

In summary, the offset frequency filter 450 in the super heterodyne optical analyzer 400 is capable of reducing intensity noise in input signals.

Reduction of Image Signals in the Superheterodyne Optical Analyzer

Figure 6:
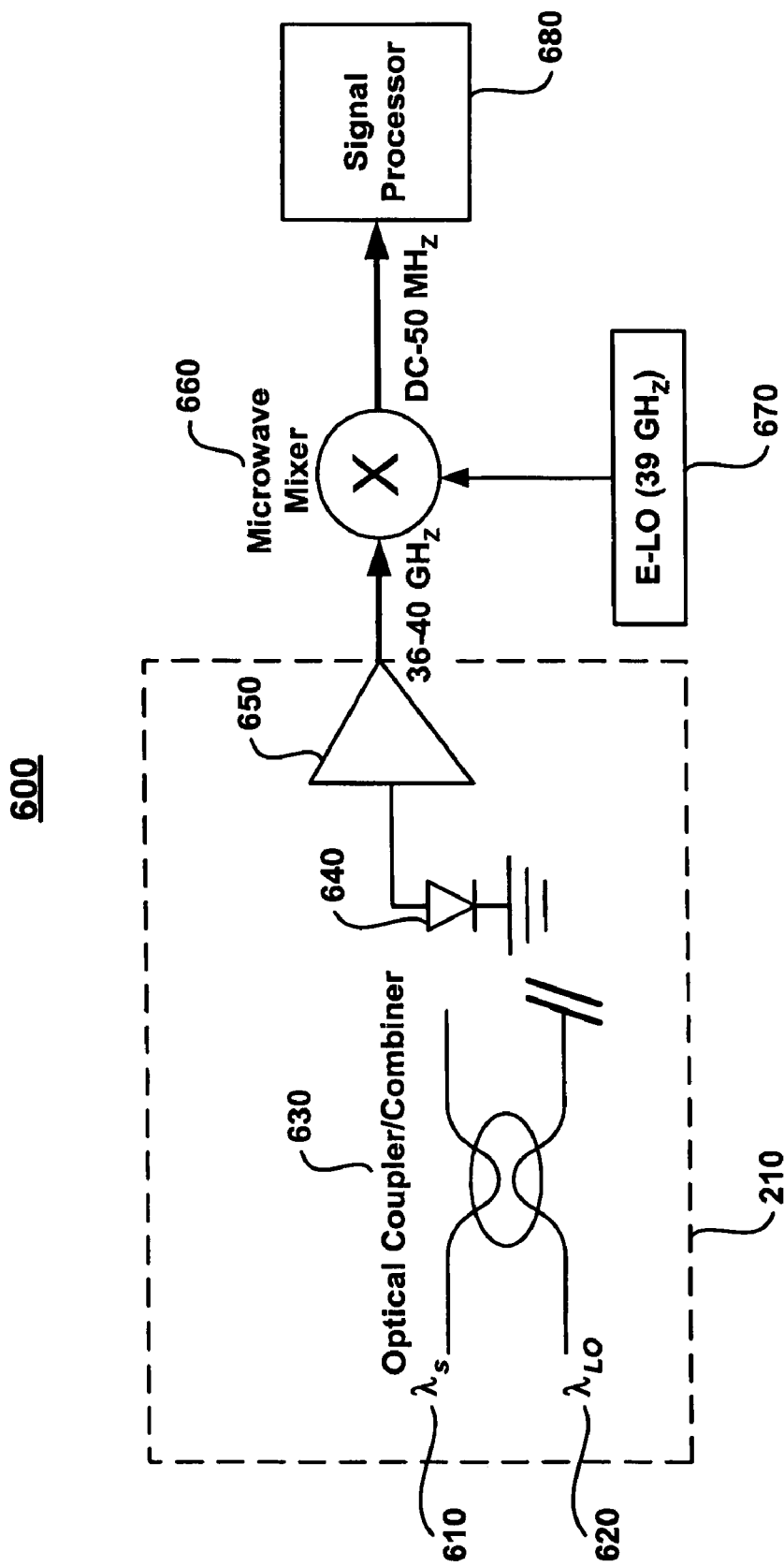
FIG. 6 is a block diagram of a superheterodyne optical analyzer capable of rejecting intensity noise, following embodiments in accordance with the invention.

Referring now to FIG. 6, a block diagram of a superheterodyne optical analyzer 600 capable of performing double conversion on an optical input signal, and rejecting image signals is shown, in accordance with another embodiment in accordance with the invention. The superheterodyne optical analyzer 600 comprises the first conversion unit 210, microwave mixer 660, electrical local oscillator 670, and a signal processor 680. The microwave mixer 660 and the electrical local oscillator 670 perform the same functions as the second conversion unit 220 of FIG. 4. Similarly, the signal processor 680 performs the same functions as the signal processor 470 of FIG. 4 and FIG. 8A.

The first conversion unit 210 of FIG. 6 comprises a coupling or combining means 630 (e.g., an optical coupler) that combines the input signal 610 with an optical local oscillator signal 620. The combined optical signal is detected and mixed by the square-law optical detector 640 to generate an electrical IF signal. The amplifier 650 amplifies the electrical IF signal for input to the microwave mixer 660.

The superheterodyne optical analyzer 600 is capable of separating images. The heterodyne process converts a real single spectral feature of the input optical signal into two reconstructed spectral features. Thus, the heterodyne process converts one real feature into two features. To reconstruct a true spectrum, one of the reconstructed features needs to be rejected. The one that is rejected is often called the image. After rejection of the image, the true spectrum is reconstructed. As a result, the spectrum is reconstructed from the heterodyne beat signal that gives rise to the two images.

Embodiments of the present invention provide an improvement over the heterodyne conversion of the conventional heterodyne processes that have zero IF frequency. Although the conventional heterodyne process with a zero IF frequency does not have images, it may have problems with amplitude accuracy due to lack of phase diversity. However, embodiments of the present invention that implement a non-zero IF always improve amplitude accuracy. While images appear when using a non-zero IF, a preselector can be used to eliminate the image problem and at the same time reduce the intensity noise. For the low frequency IF, the images are close together in optical frequency and more difficult to reject; however, the resulting phase diversity improves amplitude accuracy.

On the other hand, in some embodiments in accordance with the invention the superheterodyne optical analyzer 600 utilizes a high frequency optical receiver (high IF). In those embodiments, the superheterodyne optical analyzer 600 is able to detect the heterodyne signal at very high beat frequencies. As a result, the separation between images generated when mixing the input signal with a local oscillator signal is defined by a larger frequency distance than in optical spectrum analyzers having a low IF and a low frequency receiver. This leads to easier detection of one of the image signals without interference from the other image signal. For the high frequency IF all performance improvements are observed: better amplitude accuracy, higher reduction of intensity noise, and better image rejection.

For instance, the superheterodyne optical analyzer 600 of embodiments in accordance with the invention is capable of producing a wide separation between the image signals. For example, the superheterodyne optical analyzer 600, having a non-zero IF, is capable of separating the images by a distance of hundreds of picometers (e.g., 620 picometers for 38.8 GHz IF). Since these images are far apart, they do not interfere with each other. However, even for low frequency IF (e.g., 15 MHz), the phase diversity and improved amplitude accuracy is realizable.

Figure 7:
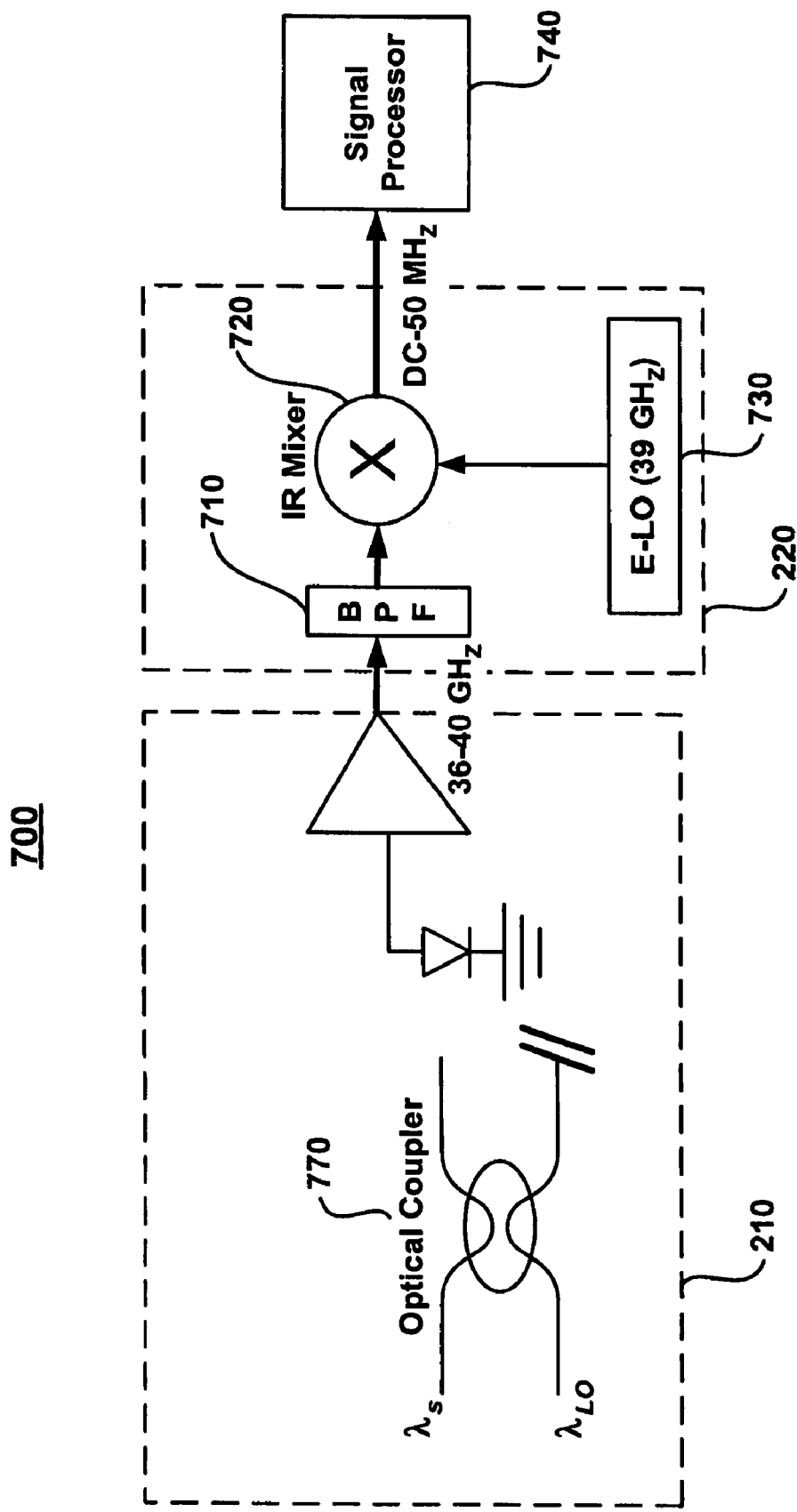
FIG. 7 is a block diagram of a superheterodyne optical analyzer capable of rejecting image signals, in accordance with the invention.

Referring now to FIG. 7, a block diagram of a superheterodyne optical analyzer 700 capable of performing double conversion on an optical input signal ($\lambda_S$ or $v_S$), and image rejection is shown. The superheterodyne optical analyzer 700 provides further illustration of the second conversion unit 220 of FIG. 4. The superheterodyne optical analyzer 700 comprises the first conversion unit 210, a second conversion unit 220, and a signal processor 740. The functions of the first conversion unit 210 in FIG. 7 are similar to the functions performed in the first conversion unit 210 of FIG. 6, as previously described in full. Similarly, the signal processor 740 performs the same functions as the signal processor 470 of FIG. 4.

The second conversion unit 220 of FIG. 7 comprises a band pass filter 710, an image reduction mixer (IR mixer) 720, and an electrical local oscillator 730. As shown in FIG. 7, the IF frequency signal from the first conversion unit has a frequency, for example, between 36-40 GHz, in another embodiment in accordance with the invention. It is desirable to down convert the high IF frequency output of the optical receiver in the first conversion unit 210 to, for example, less than 100 MHz for signal processing. However, if a microwave balanced mixer is used for such a purpose, two images are reconstructed from the electrical heterodyne beat signals in a manner analogous to image formation described above for the optical mixing. The electrical images are formed in the process of electrical heterodyning and correspond to the electrical frequencies of the signal exiting the band pass filter 710 that are below or above the frequency of the electrical local oscillator 730.

To eliminate one of the electrical images, microwave image rejecting (IR) mixer 720 is used. This type of IR mixer is well known in the field of microwaves. The IR mixer 720 combines and mixes the IF signal from the first conversion unit 210 with the local oscillator signal from the electrical local oscillator 730. The IR mixer 720 downconverts the signal that passes through the bandpass filter 710 to a low frequency wave (e.g., 100 MHz) for processing, however, one of the images is rejected. The IR mixer 720 can only provide limited image rejection, typically up to 45 dB.

To further reduce the undesired electrical image, embodiments in accordance with the invention utilize a bandpass filter 710 in conjunction with the IR mixer 720. As a result, with the addition of the bandpass filter 710, the superheterodyne system 700 achieves greater than 65 dB reduction or rejection of the undesired electrical image. The operation of the bandpass filter is analogous to the optical preselector. The filter center frequency is offset from the frequency of the electrical local oscillator 730 to provide uneven attenuation of the frequencies below and above the frequency of the local oscillator. Thus, the image problem is reduced.

To achieve the image rejection as implemented by the second conversion unit 220 of FIG. 7, the design of the IR mixer 720, the bandpass filter 710, and the center frequency of the digital receiver of the signal processor 740 must be considered together. The center frequency of the digital receiver in the signal processor 740 is set high enough to maximize the separation between the electrical image frequencies generated by the second conversion unit 220.

Also, to achieve good image rejection it is important for the bandpass filter 710 to have as high a reject band attenuation as possible.

In summary, super heterodyne optical analyzer 700 is capable of reducing an undesired image by widening the frequency separation between image signals, and through the implementation of an offset frequency filter. This technique applies to the optical conversion unit and to the electrical conversion unit.

In summary, the superheterodyne optical analyzer 700 is capable of reducing an undesired image by widening the frequency separation between image signals, and through the implantation of an offset frequency filter. This technique applies to the optical conversion unit and to the electrical conversion unit.

Figure 8A:
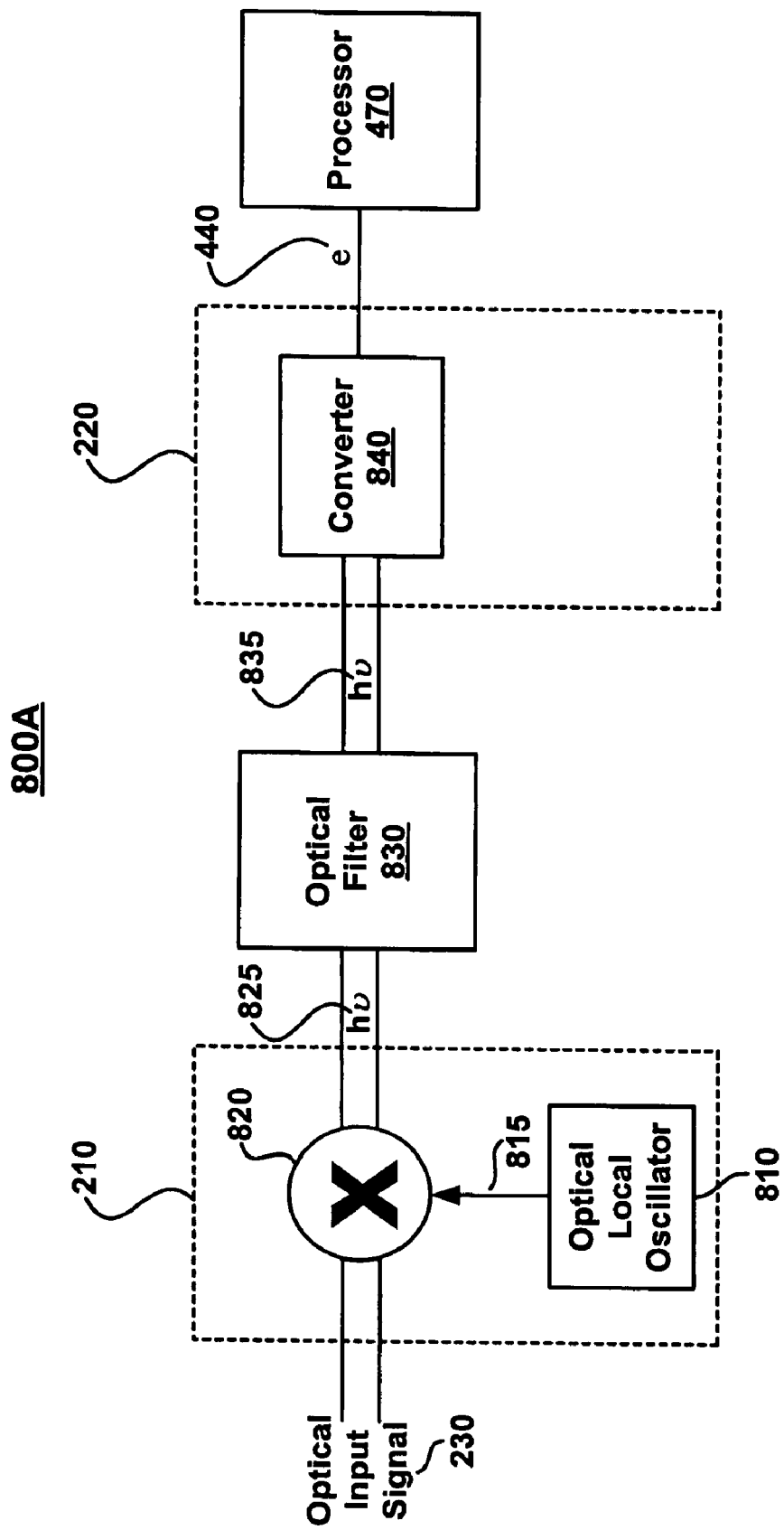
FIG. 8A is a block diagram of a superheterodyne optical analyzer performing double conversion solely in the optical domain, in accordance with the invention.
Figure 9:
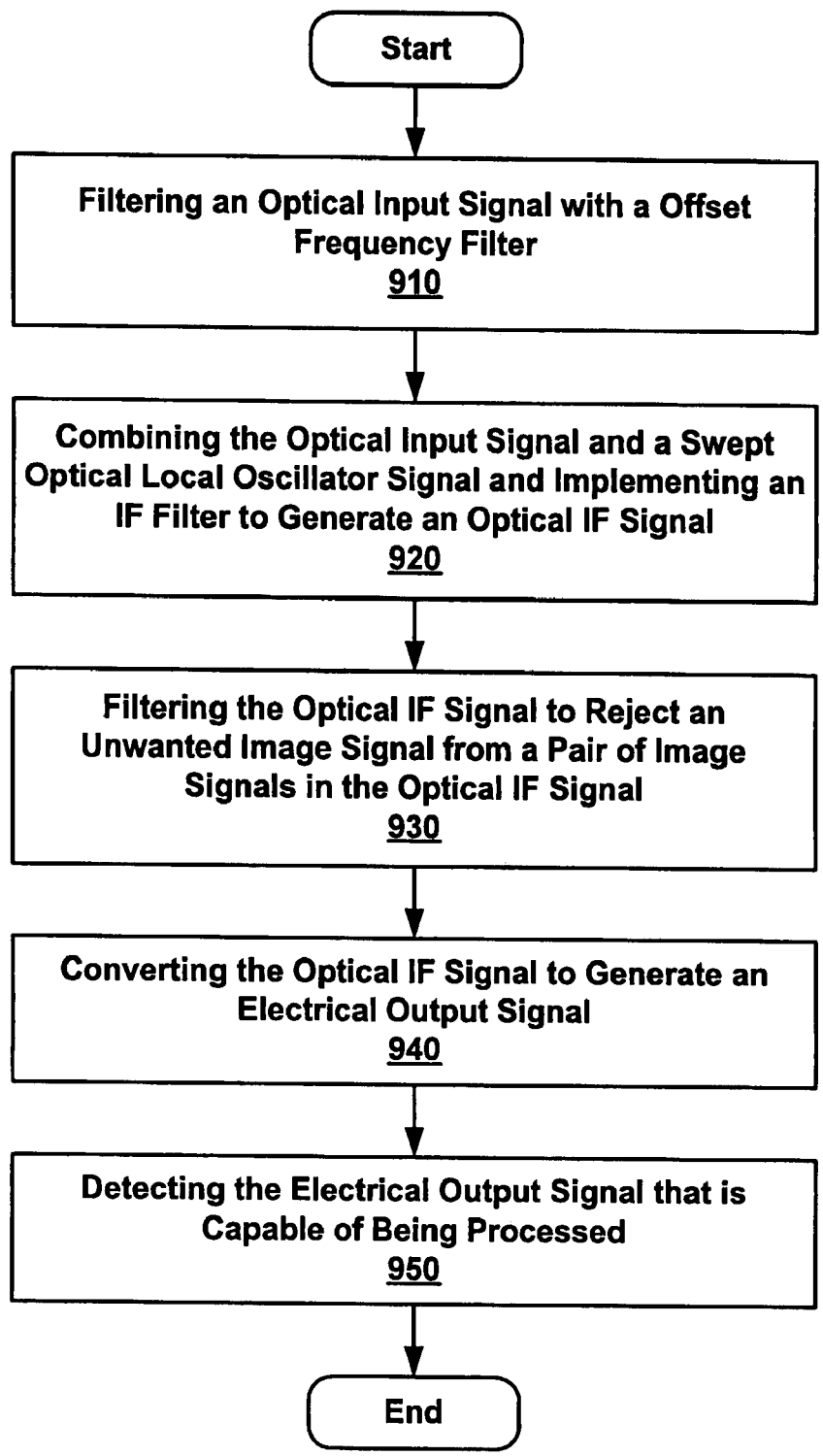
FIG. 9 is a flow chart illustrating a method for superheterodyne detection of optical input signals by performing double conversion solely in the optical domain, in accordance with the invention.

A Superheterodyne Optical Analyzer Performing Double Conversion in the Optical Domain Referring now to FIG. 8A and FIG. 9, the following discussion begins with a description of the structure of components of superheterodyne optical analyzers performing double conversion primarily in the optical domain, for embodiments in accordance with the invention. Thereafter, a description of the specific operation of the superheterodyne optical analyzer is disclosed.

Fundamental Components of the Superheterodyne Optical Analyzer Performing Double Conversion in the Optical Domain In FIG. 8A, a block diagram is shown illustrating a superheterodyne optical analyzer 800A performing double conversion primarily in the optical domain, in one embodiment in accordance with the invention. The superheterodyne optical analyzer 800A provides further illustration of the first conversion unit 210 and second conversion unit 220 of FIG. 2, and further includes additional features, such as, the optical filter 830 and the signal processor 470.

Specifically, the superheterodyne optical analyzer 800A comprises the first conversion unit 210 and the second conversion unit 220 of FIG. 2. The first conversion unit 210 takes as an input the optical input signal 230. The first conversion unit 210 of FIG. 8A performs a first heterodyne operation to convert the input optical signal 230 into an IF optical signal 825. Thus, the superheterodyne optical analyzer 800A generates the IF signal 825 in the optical domain.

The first conversion unit 210 as shown in FIG. 800A comprises a mixer 820 that combines the optical input signal 230 with an optical local oscillator signal 815 from the optical local oscillator 810. The mixer 820 generates an optical IF frequency signal 825.

In FIG. 8A, in one embodiment in accordance with the invention, an optional offset frequency filter (not shown) filters the optical input signal 230 to reduce undesired image response.

In FIG. 8A, the superheterodyne optical analyzer 800A comprises an optical filter 830 that is optically coupled to the first conversion unit 210. The optical filter 830 is optional, and is implemented depending on the measuring requirements. The optical filter 830 rejects a first image signal from a pair of images in the optical IF frequency signal 825. Also, the optical filter 830 may reduce intensity noise. The optical filter 830 generates a filtered optical IF frequency signal 835.

In FIG. 8A, the superheterodyne optical analyzer 800A comprises the second conversion unit 220 of FIG. 2 that is optically coupled to the optical filter 830. The second conversion unit 210 performs a second conversion operation to convert the optical IF frequency signal to an electrical output signal 440 that is capable of being processed. More specifically, the superheterodyne optical analyzer 800A converts an optical IF signal to an electrical signal 440 for processing.

The second conversion unit 220 as shown in FIG. 8A comprises a converter 840. In another embodiment in accordance with the invention, the converter 840 comprises a photodetector that is optically arranged to receive the filtered optical IF frequency signal 835 and generates electrical signals in response to the filtered optical signal 835.

The converter 840 generates the electrical output signals 440 of FIG. 8A and FIG. 2. The converter 840 converts the filtered optical IF frequency signal 835 to the electrical output signal 440 through a non-linear function. As described previously, the non-linearity arises because at the photodetector the optical field E is converted to the electrical current i through a squaring operation i=EE*, where E* denotes a complex conjugate of E.

In FIG. 8A, a signal processor 470 is electrically coupled to the second conversion unit 220 for processing the electrical output signal 440. The characteristics of the signal processor 470 have been previously described in full with respect to FIG. 4. As such, the superheterodyne optical analyzer 800A is capable of measuring optical field spectrum characteristics of the optical input signal 230, and parameters associated with the optical input signal 230.

Figure 8B:
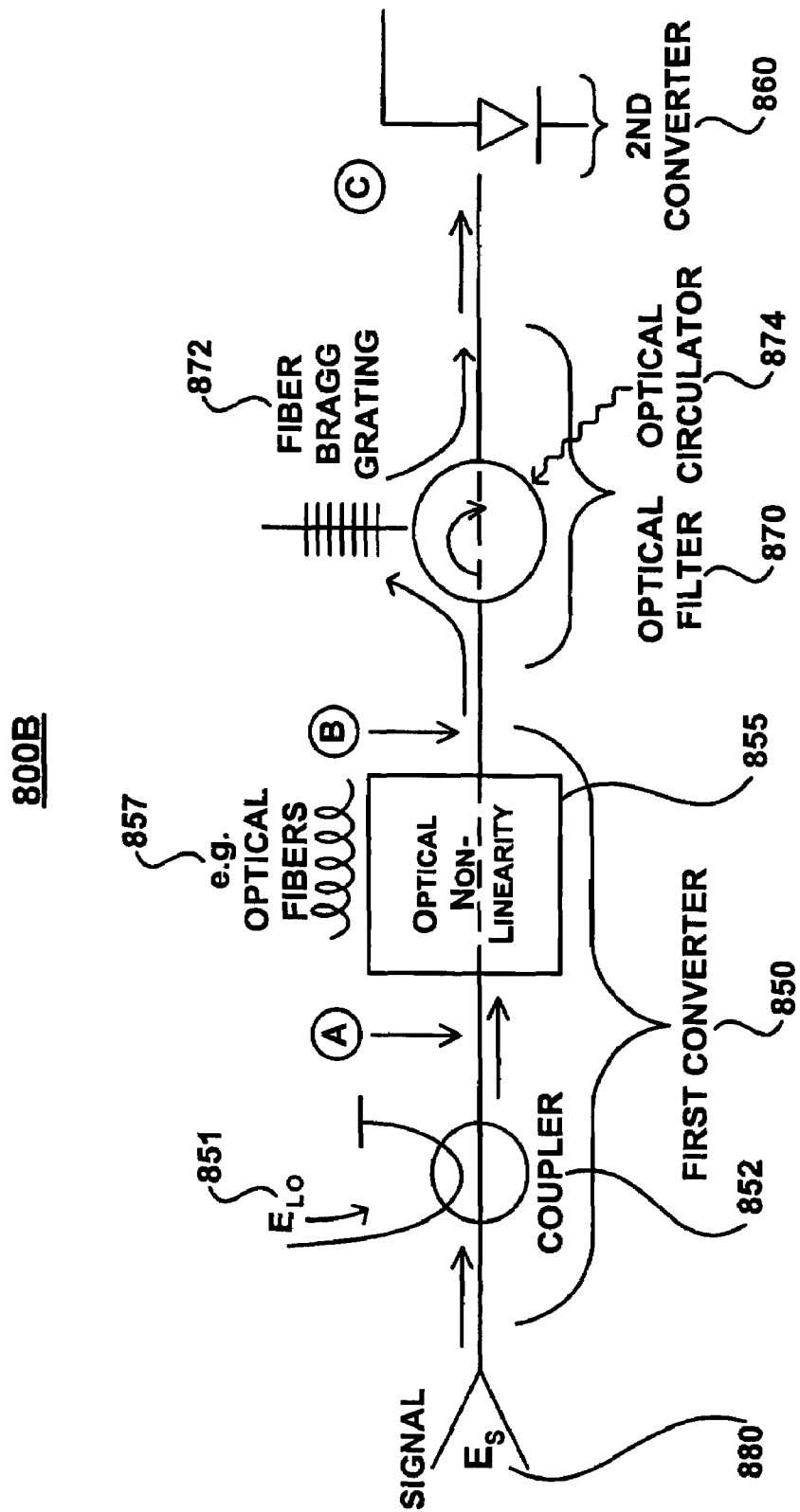
FIG. 8B is a block diagram of a superheterodyne optical analyzer performing double conversion solely in the optical domain, in accordance with the invention.

FIG. 8B is a block diagram of a system 800B for superheterodyne detection. The system in FIG. 8B is a practical implementation of the system in FIG. 8A. The system 800B comprises a first conversion unit 850, a second conversion unit 860 and an optical filter 870.

The first conversion unit 850 is configured to receive an optical input signal $E_s$ 880. In the first conversion unit 850, the optical signal $E_s$ 880 is combined with an optical local oscillator signal $E_{LO}$ 851 at a coupler 852 located within the first conversion unit 850. Polarization alignment or diversity is assumed to ensure interaction of the optical local oscillator signal $E_{LO}$ 851 with the optical input signal $E_s$ 880.

The combined optical signal outputted from the coupler 852 is subjected to an optical non-linearity in the module 855, as shown in FIG. 8B. The optical non-linearity contained in module 855 may take place within a crystal or an optical fiber, in embodiments in accordance with the invention. In the parametric process, a property within the transmission media (e.g., the crystal or optical fiber), such as, induced polarization, is non-linear with the incident field. This leads to mixing between the input optical signal $E_s$ 880 and the optical local oscillator signal 851. An optical non-linearity, for example, is created by a long strand of single mode optical fiber 857, in one embodiment in accordance with the invention. In FIG. 8, the optical non-linearity is due to cross-phase modulation within the optical fiber 857.

In addition, the optical filter 870 is coupled to the first conversion unit 850. The optical filter 870 is, for example, comprised of a fiber Bragg grating unit 872 and an optical circulator 874. The fiber Bragg grating unit 872 and the optical circulator 874 is used to create an optical bandpass filter. The optical circulator 874 is well known in the art.

The superheterodyne optical analyzer 800B provides for noise reduction, resolution, and increased amplitude accuracy through rejection of an image.

Operational Characteristics of the Superheterodyne Optical Analyzer Performing Double Conversion in the Optical Domain Referring now to FIG. 9, a flow chart 900 is described illustrating a method for superheterodyne detection of optical signals performing double conversion in the optical domain, in another embodiment in accordance with the invention. The method begins by optionally filtering an optical input signal with a frequency offset filter, in 910. The frequency offset filter is capable of reducing an image.

At 920, the method combines the optical input signal and an optical swept local oscillator signal. An optical IF signal is generated after application of an optical mixer in the optical domain. The resulting optical IF signal comprises images in the heterodyne beat signals, each of which contain complete information pertaining to the optical characteristics of the optical input signal. In another embodiment in accordance with the invention, the optical images are sufficiently spaced apart in distance for optical filters to eliminate one of the image signals.

At 930, the method filters the optical IF signal to reject a first image from a pair of images to produce a filtered optical IF signal. The remaining image contains all the information pertaining to the optical characteristics of the optical input signal. Filtering of one of the images is possible since the high frequency optical IF signal separates the images a sufficient distance in optical frequency for filtering.

At 940, the method converts the filtered optical IF signal to generate an electrical output signal.

At 950, the method detects the electrical output signal to convert the output signal to an electrical output signal that is capable of being processed. The electrical output signal is processed to measure an optical field spectrum of the optical input signal. Also, the electrical output signal is processed to measure optical characteristics of the optical input signal, such as, parameters of the optical input signal.

Hence, the superheterodyne optical analyzer 800A is capable of sufficient resolution through the reduction of images by operating at optical IF frequencies. Furthermore, the superheterodyne optical analyzer 800A provides for noise reduction, sufficient resolution, and amplitude accuracy, when measuring optical characteristics of input signals.

A Superheterodyne Optical Analyzer Performing Double Conversion Including Additional Detection Schemes Although embodiments in accordance with the invention are disclosed including a superheterodyne optical analyzers of FIG. 2, FIG. 4, and FIG. 8A with double conversion, other embodiments in accordance with the invention are well suited to using techniques known to those skilled in the art of coherent detection.

Figure 10A:
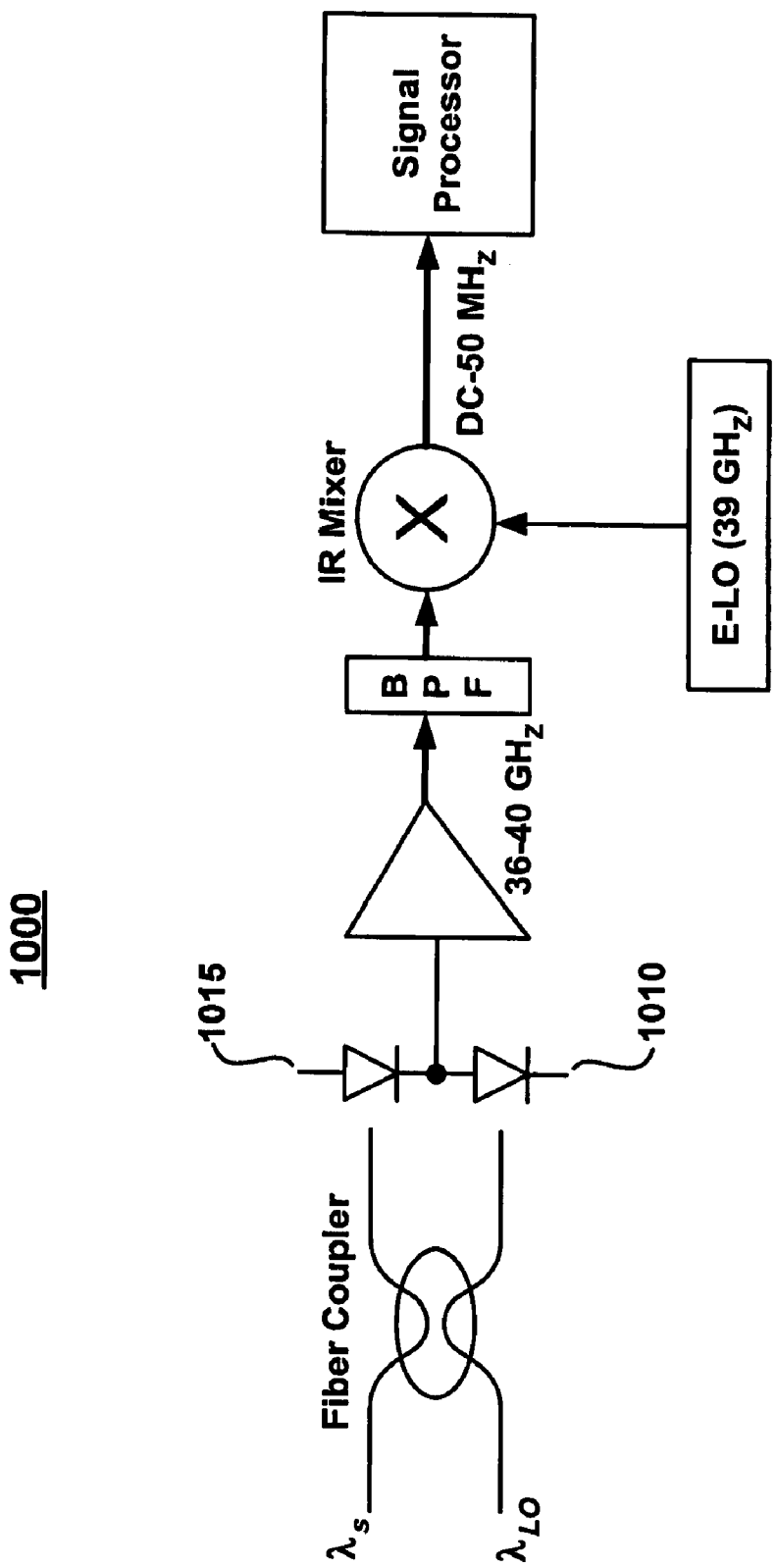
FIG. 10A is a block diagram of superheterodyne optical spectrum analyzer having balanced detection with two optical detectors, in accordance with the invention.
Figure 10B:
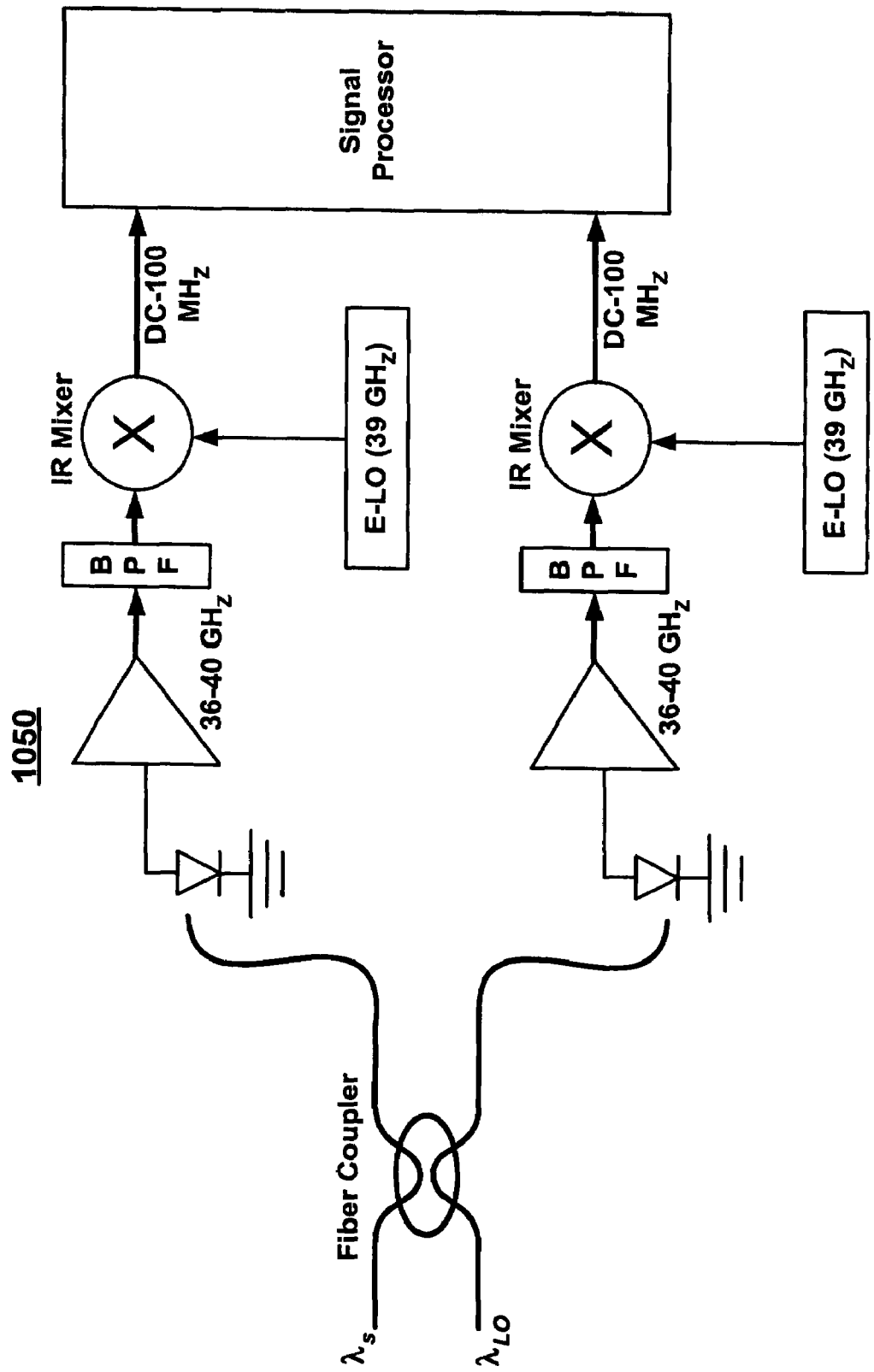
FIG. 10B is a block diagram of a superheterodyne optical spectrum analyzer having balanced detection with two optical receivers, in accordance with the invention.

For example, FIG. 10A and FIG. 10B are block diagrams of image rejection superheterodyne optical spectrum analyzer systems 1000 and 1050, respectively, having balanced detection schemes for reducing intensity noise, in embodiments in accordance with the invention. The superheterodyne system 1000 of FIG. 10A performs balanced detection with two optical detectors 1010 and 1015 for increased suppression of intensity noise. The superheterodyne system 1050 of FIG. 10B performs balanced detection with two optical receivers. The image rejection scheme as described in relation to FIG. 7 is used to reject an image in the electrical heterodyne beat signal in the balanced detection schemes described in systems 1000 and 1050, in accordance with another embodiment in accordance with the invention.

More specifically, in FIG. 10B, the subtraction (or balancing) is performed by the processor and not by a direct subtraction of the photodetector currents as shown in FIG. 10A. Thus, the processor can compensate for any imbalance between the two signal channels. The imbalance can be created either in the optical path (e.g., fiber optic coupler wavelength and polarization state dependence), or in the electrical path (e.g., different responsivity and frequency characteristics of the photodetectors).

Accordingly, embodiments in accordance with the invention provide a method and system for superheterodyne detection using double conversion. In a superheterodyne detection system a first conversion is performed to generate an electrical IF signal that is capable of sufficient frequency separation between image frequencies. That is, embodiments in accordance with the invention realize superheterodyne optical analyzers that are capable of generating sufficient frequency separation between created images. Also, embodiments in accordance with the invention achieve improved amplitude accuracy by operating at a non-zero IF frequency. In doing so, embodiments in accordance with the invention achieve improved signal-to-noise ratios while using only a single optical receiver, however, in some situations, if required, the balanced detection scheme provides additional means of the intensity noise cancellation. In addition, further band pass filtering of one of the electrical image signals is possible due to the electrical frequency separation thereby achieving a 65 dB reduction in the image signal in the embodiment with the IR mixer. A second conversion is performed to generate an electrical output signal that is suitable for signal processing.

While the methods of embodiments illustrated in flow charts 300, 500, and 900 show specific sequences and quantity of steps, embodiments in accordance with the invention are suitable to alternative embodiments. For example, not all the steps provided for in the methods are required for embodiments in accordance with the invention. Furthermore, additional steps can be added to the steps presented in embodiments in accordance with the invention. Likewise, the sequences of steps can be modified depending upon the application.

A method and system for superheterodyne detection of an optical input signal is thus described. While embodiments in accordance with the invention have been illustrated and described by means of specific embodiments, it is to be understood that numerous changes and modifications may be made therein without departing from the spirit and scope of embodiments in accordance with the invention as defined in the appended claims and equivalents thereof. Furthermore, while embodiments in accordance with the invention have been described in particular embodiments, it should be appreciated that embodiments in accordance with the invention should not be construed as limited by such embodiments, but rather construed according to the below claims.

What is claimed is:

1. A system for superheterodyne detection comprising:
a first conversion unit for performing a first heterodyne operation on an optical input signal to generate an electrical IF signal, the first conversion unit comprising i) a local oscillator for generating a swept local oscillator signal, ii) a coupler for coupling said optical input signal and said swept local oscillator signal, and ii) a photodetector; and
a second conversion unit, electrically coupled to said first conversion unit, comprising i) an electrical local oscillator for generating a fixed electrical local oscillator signal, and ii) a mixer coupled to said electrical local oscillator for performing a second heterodyne operation by mixing said electrical IF signal and said fixed electrical local oscillator signal to generate an electrical output signal suitable for signal processing.

2. The system of claim 1, wherein said first conversion unit comprises:
an IF amplifier; and
an IF filter.

3. The system of claim 1, where said signal processing comprises a reconstruction of an optical spectrum of said optical input signal.

4. The system of claim 1, further comprising:
a processor for processing said electrical output signal to measure optical parameters of said optical input signal.

5. The system of claim 1, wherein said first conversion unit reduces the effect of intensity noise.

6. The system of claim 1, wherein said first conversion unit separates an image in said electrical IF signal to improve amplitude accuracy of said optical input signal.

7. The system of claim 1, wherein said first conversion unit produces a non-zero electrical IF signal.

8. The system of claim 1, wherein said second conversion unit comprises a microwave image rejection mixer.

9. The system of claim 1, wherein said second conversion unit comprises a band pass filter coupled to said first conversion unit, wherein said band pass filter is offset from an electrical local oscillator in said second conversion unit to further reduce an image.

10. The system of claim 1, wherein said second conversion unit downconverts said electrical IF signal to said electrical output signal.

11. A method for superheterodyne detection comprising:
performing a first heterodyne operation to combine an optical input signal and an optical swept local oscillator signal to generate an IF signal in an electrical domain, said IF signal implementing a non-zero IF; and
performing a second heterodyne operation to combine said IF signal in said electrical domain and a fixed electrical local oscillator signal to generate an electrical output signal suitable for being processed.

12. The method of claim 11, wherein said performing said second heterodyne operation comprises:
downconverting said IF signal in said electrical domain to said electrical output signal.

13. The method of claim 11, further comprising:
filtering said IF signal to reject a first image from a pair of images in said IF signal.

14. The method of claim 11, further comprising:
filtering intensity noise and a first image from a pair of images in said IF signal with an optical filter placed in front of said fist conversion unit that is offset from an optical local oscillator in said first conversion unit.

15. The method of claim 11, further comprising:
processing said output electrical signal to measure an optical field spectrum of said optical input signal.

16. The method of claim 11, further comprising:
processing said electrical output signal to measure parameters of said optical input signal.

17. The method of claim 11, wherein said IF signal comprises a non-zero electrical IF signal.

18. The method of claim 11, further comprising:
performing said second conversion with a microwave image rejection mixer.

19. The method of claim 11, further comprising:
filtering said IF signal to reducing an image.

20. A system for superheterodyne detection comprising:
a first conversion unit for performing a first heterodyne operation to combine an optical input signal and a swept optical local oscillator signal, said first conversion unit generating an electrical IF signal;
a second conversion unit electrically coupled to said first conversion unit for performing a second heterodyne operation when combining said electrical IF signal and a fixed electrical local oscillator signal to generate an electrical output signal; and
a balanced detection unit for canceling intensity noise.

* * * * *